United States Patent

[11] 3,603,079

| [72] | Inventor | Ernst Kickbusch<br>Eschenhofstrasse 46, 89 Augsburg,<br>Germany |
|---|---|---|
| [21] | Appl. No. | 851,855 |
| [22] | Filed | Aug. 21, 1969 |
| [45] | Patented | Sept. 7, 1971 |
| [32] | Priority | Aug. 22, 1968, Oct. 21, 1968, July 11, 1969 |
| [33] | | Germany |
| [31] | | P 17 51 941.4, P 18 06 235.6 and P 19 35 230.8 |

[54] SUPERCHARGED INTERNAL COMBUSTION ENGINE, PARTICULARLY SUPERCHARGED DIESEL ENGINE FOR VEHICULAR DRIVES
17 Claims, 9 Drawing Figs.

| [52] | U.S. Cl. | 60/13, 123/119 CA |
|---|---|---|
| [51] | Int. Cl. | F02b 37/08 |
| [50] | Field of Search | 60/13; 123/119 C |

[56] References Cited
UNITED STATES PATENTS

| 2,383,979 | 9/1945 | Lysholm | 60/13 |
|---|---|---|---|
| 2,542,539 | 2/1951 | Kuhrt | 60/13 |
| 2,691,269 | 10/1954 | Chamberlain | 60/13 |
| 2,769,303 | 11/1956 | Lucia | 60/13 |
| 3,097,478 | 7/1963 | Luck | 60/13 |
| 3,370,417 | 2/1968 | Koziara | 60/13 |
| 3,487,634 | 1/1970 | May | 60/13 |

*Primary Examiner*—Douglas Hart
*Attorney*—Bauer and Goodman

ABSTRACT: A turbine, driven from the exhaust gases of the internal combustion engine, and having a speed-flow volume and pressure differential characteristic which is only speed-dependent drives a Foettinger hydrodynamic torque converter which has a pump element which is highly speed-dependent, a radial flow turbine which is only little speed-dependent, and a guide vane element, the radial flow turbine of the fluid coupling driving a displacement-type rotary compressor so that, even at low engine speeds of the internal combustion engine, substantial supercharging effect can be obtained, whereas, as the engine speed increases, less supercharging effect will be obtained so that the average cylinder pressure at low speeds will be increased of cylinder pressure and engine torque will increase with decreasing speed, keeping the output power constant over a wide range of engine-operating speeds.

SUPERCHARGED INTERNAL COMBUSTION ENGINE, PARTICULARLY SUPERCHARGED DIESEL ENGINE FOR VEHICULAR DRIVES

The present invention relates to a supercharging arrangement for use with internal combustion engines, and particularly for a supercharger-internal combustion engine combination, especially for Diesel engines for vehicular use. The supercharger is preferably driven independently from the engine shaft by a turbine powered by the exhaust gases of the internal combustion engine, the supercharger providing such additional gas under pressure that the average effective cylinder pressure will be increased even at lower speeds.

Internal combustion engines of the piston type are limited in their application because the average cylinder pressure ($P_{me}$) is approximately constant throughout the entire range of speed of the engine, so that the torque, which is proportional to average cylinder pressure, is also approximately constant. Vehicular prime movers require motors, however, having a torque characteristic which is as close to that of a steam engine, as possible. The energy derived from the exhaust gases of internal combustion engines, due to incomplete expansion, can be utilized to improve the performance of the internal combustion engine by driving a supercharger, particularly if the supercharger is so arranged that its optimum performance is in the range of lowest speed of the internal combustion engine. Yet, it is still necessary usually to use variable types of transmission, and gear change arrangements in order to have substantially uniform power output over a wide range of speeds.

To obtain constant power, it has previously been proposed to utilize controllers acting both on the fuel, as well as on the air supply to the engine. Such apparatus is costly, and the efficiency of the engine substantially decreases due to the change of fuel-air ratio. The maximum power available from the engine still cannot be used since excessive heating would result.

Another solution to the problem has been a differential drive, in which a pump is driven over a branch of a differential gear from the engine, either mechanically, hydrodynamically or hydrostatically, the other branch of the differential being connected to the power takeoff from the engine, for example to the wheels of a vehicle. The entire arrangement is so made that the torque to the pump is proportional to the torque of the engine.

A further system has been disclosed during a CIMAC conference held in the Hague, 1955, and published in the conference reports—A12—pages 275 to 294, entitled "Une locomotive à transmission thermo-pneumatique." According to this proposal, a differential drive is utilized to split the power from a Diesel engine, one portion driving a supercharger compressor, and the other being connected to the drive wheels of a locomotive. In addition, the locomotive is driven by a gas turbine which partly receives the exhaust from the Diesel engine, partly energy from the compressor, so that simultaneously an increase in the air energy results due to mixing of the exhaust gases with the air. The energy for the exhaust has turbine can be further increased by addition of an auxiliary combustion chamber. Further developments in this connection would finally lead to the point at which the Diesel motor acts solely as a gas generator for a power turbine.

Another, and simpler solution provided a V-drive belt, driving a displacement-type compressor over a variable drive from the engine in such a manner, that the desired torque characteristics can be obtained. Combination of such a compressor with an exhaust gas supercharger will further improve the effectiveness, since the energy in the exhaust gases can be utilized. It is also known to utilize displacement-type compressors, driven directly by the engine, to effect supercharging of the engine itself.

The aforementioned proposals have the disadvantage that power is taken from the engine in order to provide precompression of the charging air. This power loss can reach up to 25 percent of the available shaft power output of the engine, increasing substantially the fuel consumption with respect to the power available at the drive wheel. Additionally, differential drives require complicated gearings and it is difficult, for example with planetary drives, to achieve optimal conditions for the entire operating range of the motor regarding pressure and airflow. The pressure does not increase linearly in case of adiabatic compression. Additional transmission steps would be necessary, requiring additional control. The entire system then becomes complicated and requires many parts and, further, may go into oscillations which cause difficulties Combining an exhaust gas turbine with such a differential supplementary drive does not substantially alleviate the situation.

It is an object of the present invention to provide a supercharging system for use with an internal combustion engine, in which the average cylinder pressure ($P_{me}$) can be changed, so that a substantially constant power output can be obtained for the engine, the energy for supercharging the engine being derived from the energy in the exhaust gases thereof, so that the use of the fuel is efficient The arrangement should further be suitable for any power within the power rating of the engine, and with any type of engine supplied by the manufacturer, entirely independently of the use to which the engine is put by the purchaser. Additionally, the engine should have such characteristics that known and commercially available transmissions for vehicles, or other utilization equipment can be connected thereto, utilizing, however, as few transmission steps as possible and preferably only a two-range transmission even for use in heavy vehicles such as trucks.

SUBJECT MATTER OF THE PRESENT INVENTION

Briefly, an exhaust gas turbine driven essentially by the velocity of the exhaust gases is coupled with a rotary supercharging compressor operating on the displacement principle. The coupling, in accordance with the invention, includes a hydrodynamic torque converter which has a fluid pump connected to the rotor of the exhaust has turbine and having a speed vs. fluid supply pressure—fluid supply volume characteristic which is highly speed dependent, the pump supplying hydraulic liquid as deflected by vanes to a turbine driving the displacement-type compressor, which drive has a characteristic which is only little speed-dependent. The speed dependency, as used herein, of the pumps is here defined as follows:

$$n_a = n \cdot \frac{\sqrt{V}}{H^{3/4}} \quad (1)$$

wherein $n$ = speed (r.p.m.) $V$ = flow volume, and $H$ = differential pressure.

The exhaust gas turbine is, preferably, a centripetal turbine, designed for approximately constant throughput with varying pressure. The hydrodynamic energy transfer preferably is a fluid torque converter known as a Foettinger converter which may be arranged to change its transfer characteristics, such as adjustable blades, arrangements to control pressure, to change the quantity of hydraulic fluid, or the like. The elements of the torque converter, the hydraulic pump, and the utilization apparatus, that is, the hydraulic turbine, may be remotely located from each other. The hydraulic fluid itself is preferably obtained from liquid already available in the engine, for example from the lubrication circuit, from the hydraulic circuit of an automatic transmission, or the like, so that a separate heat exchanger, or other radiator to cool the liquid, as well as pressure regulator and indicator devices may be saved.

The invention will be described by way of example with reference to the accompanying drawings, wherein.

and FIG. 10 illustrates, schematically, the supercharging arrangement connected to an engine, and remotely controlled.

Figure 1:
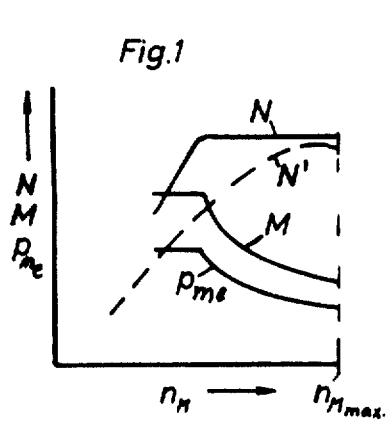
FIG. 1 is a graph of torque, average effective cylinder pressure $P_{me}$, and power, with respect to engine speed.

In FIG. 1, the ordinate represents motor power output N, torque M, and effective average cylinder pressure $P_{me}$, the abscissa motor speed $n_M$ of an internal combustion motor. Motors as usually designed and ordinarily supplied with fuel have an average effective cylinder pressure $P_{me}$ which is essentially constant, so that torque M will also be essentially constant, over their entire effective speed range. Thus, the power characteristics (power vs speed) will follow approximately along the dashed line N', reaching a maximum power output at $n_{Mmax}$. It is now an object of the invention to change this motor characteristic in such a manner that both average cylinder pressure, and with it torque increase with decreasing motor speed, so that, preferably, the maximum power $N_{max}$ is substantially constant over a wide range of speed. Graphically expressed, all possible power-speed characteristic curves between N' and $N_{max}$ should be encompassed within the operating characteristics of the motor, and preferably by controlling supercharger pressure. Obtaining constant power output from the engine over a wide range of speed then permits utilization of the engine without stepped transmissions. Diesel engines for marine use do not require high average piston pressure $P_{me}$ at low engine speeds, however it is still desirable to have highest output available down to about 25 percent of maximum speed, even from 2-stroke marine engines. This object can be achieved by the present invention.

Figure 2:
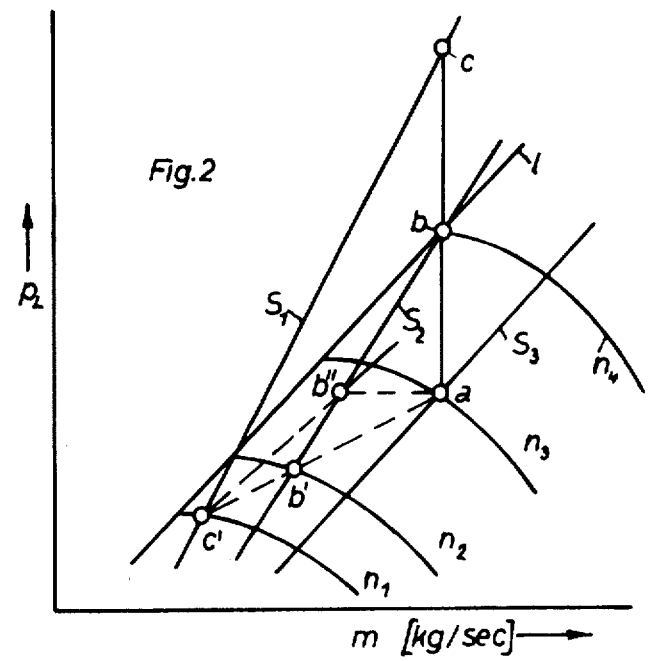
FIG. 2 is a graph of supercharging pressure $P_L$ depending of throughput $m$ of a volumetrically operating supercharger having a rotary blower, for various load lines of the engine.

The graph of FIG. 2 illustrates the cooperation of a volumetric compressor, such as a blower, centrifugal compressor, or the like, together with a cylinder-type internal combustion engine. The ordinate represents pressure $P_L$, the abscissa volume flow $m$ in kg./sec. The stable operating range of a centrifugal compressor is indicated by the characteristic curves $n_1, n_2, n_3, n_4$, as well as by the surge-line limiting line 1. The intake consumption lines of the motor, at three different speeds, are indicated by the lines $S_1, S_2, S_3$.

An ordinary exhaust has turbo supercharger will operate, at maximum motor speed corresponding to $S_3$, at operating point $a$, having supercharger pressure $P_{La}$ and a throughput $m_a$. As motor speed decreases, operating points $b'$ and $c'$ will be reached, that is both pressure and throughput decrease. By use of an auxiliary drive it is possible to increase the operating pressure with decreasing speed, so that even with an engine speed of $S_2$, operating point $b''$ will result, and the pressure will remain constant between $a$ and $b''$. Throughput, however, would still be decreased. A motor having constant power output must have approximately the same air charge applied thereto. This would require increasing the speed of the centrifugal compressor. At operating point $b$, and with an air consumption line corresponding to speed $S_2$, the pump limit 1 is quickly reached, that is already at operating point $b$. Reaching operating point $c$, again, would only be possible by additional power diverted from the engine, and by additional apparatus or operating steps, for example by adding compressed air obtained from a separate source. This, however, is uneconomical, and further increases fuel consumption.

An additional disadvantage of the known supercharging system having turbine-type compressors operating approximately along the operating characteristics $c'-b'-a$ arises from the fact that the power balance between turbine and supercharger can be achieved only with substantially varying air-fuel ratios $\lambda$. Changing $\lambda$, however, not only changes the efficiency of the engine, but further its operating characteristics, and when $\lambda$ decreases below a certain limit, the engine will smoke and additionally transition between acceleration, running, and deceleration is impeded.

Increasing operating pressure on the piston with constant throughput can be obtained only with a displacement-type supercharger which, in accordance with the present invention, is connected over a hydrodynamic energy transfer arrangement, having a fluid pump with high speed dependence in its fluid supply pressure-volume-speed characteristics, to a turbine wheel of low speed dependence coupled to the exhaust gas turbine. The increase in average cylinder loading with constant throughput in accordance with line $a$–$b$–$c$ requires substantially constant speed for the displacement compressor. The exhaust gas turbine operates also with substantially constant throughput, however with different enthalpy drops H, so that its speed does not remain constant. The energy transfer arrangement, as specified, which is hydrodynamic, enables conversion of changing speeds of the exhaust gas turbine to a constant speed of the displacement-type compressor for the supercharger.

Figure 3:
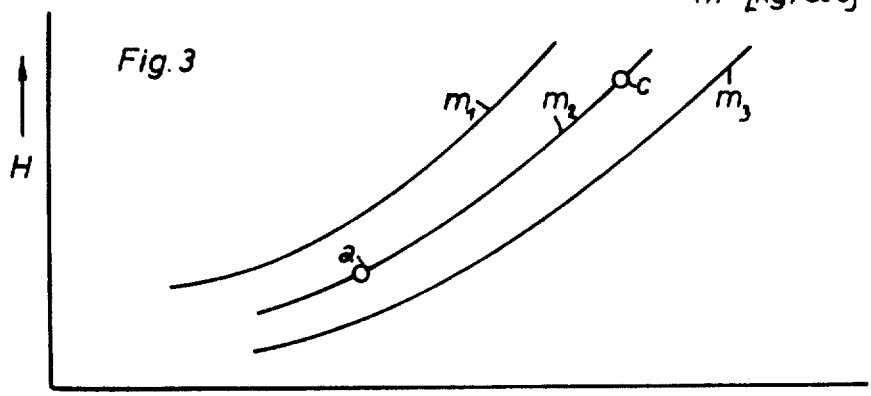
FIG. 3 is a graph of throughput $m$ of an exhaust gas turbine with respect to turbine pressure H or, respectively, enthalpy, and depending on turbine speed $n_T$.

An internal combustion engine-supercharger combination in accordance with the present invention thus operates with high quantities of air, and applied at substantial pressure, for each stroke, even at low engine speed, which in turn enables combustion of larger quantities of fuel. This, in turn, has as a result that the enthalpy of the motor exhaust gases is higher at low engine speeds, than at high engine speeds, so that the enthalpy difference, or drop available to the turbine is any speed range is substantially greater than with engines of the prior art. FIG. 3 illustrates this relationship, in which the ordinate represents the enthalpy drop H in the turbine, in enthalpy units, and the abscissa the turbine speed $n_T$. $m$ lines $m_1, m_2, m_3$, indicate the relationship of enthalpy and speed with various constant flow rates (in kg./sec.). The intermediate characteristic line $m_2$ indicates the two operating points $a$ and $c$ similar to FIG. 2, and the substantial turbine drop between points $a$ and $c$ will be immediately apparent. In order to obtain good energy transfer, and in accordance with a feature of the present invention, the exhaust turbine is formed with a centripetal, that is inwardly directed flow and designed for constant flow rate $m$ with various drops H. Such a turbine may be one which has a spiral inlet housing, without guide vanes or blades in the inlet guide, and with a turbine wheel of sufficient radial extent, at least 20 percent greater than the suction duct diameter at the outlet, so that centrifugal forces arising at higher turbine speeds will cause a turbine reaction which decreases the otherwise higher flow rate at increased enthalpy drop.

Figure 4:
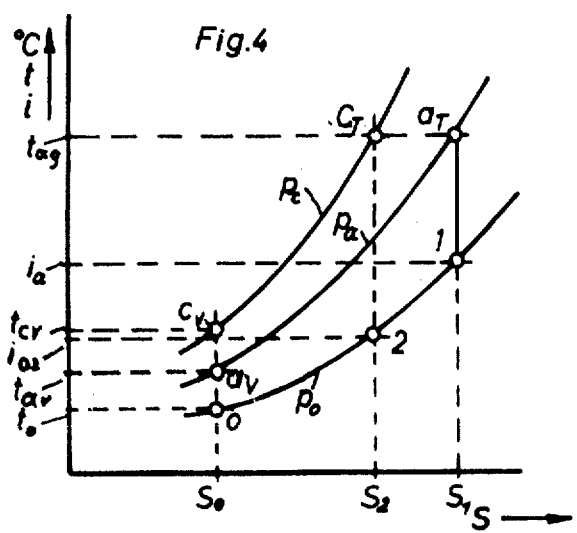
FIG. 4 is a temperature (T/enthalpy($i$))-entropy($s$) graph.

The thermodynamic relationships are illustrated once more in FIG. 4 is a temperature/enthalpy-entropy graph. The ordinate indicates temperatures $t$ in °C., and the enthalpy of the air, or the exhaust gases, respectively; the abscissa represents the corresponding entropy values $s$. $P_O, P_a, P_c$ are isobars of air, in which $P_O$ represents the ambient air pressure, $P_a$ pressure at operating point $a$ (FIG. 2), and $P_c$ pressure at operating point $c$ The volumetric compressor receives air in condition O ($p_o, t_o, s_o$). After adiabatic compression, and at operating point $a$, the air will be at the condition $a_v$ ($p_a, t_{av}, s_o$). In this condition, air is introduced into the engine, in order to be utilized in the operating cycle. After expansion in the cylinder (incomplete expansion is here neglected), the output gases in condition $a_t$ ($p_a$, exhaust gas temperature $t_{ao}$, $S_1$) leave the engine and, in this condition, arrive at the turbine, where they are expanded into the condition 1 ($p_o, t_{01}, S_1$). The turbine drop is defined by the distance $a_T$-1.

Compression of the air to the pressure $p_c$ (corresponding to operating point $c$, FIG. 2) causes air to be introduced into the engine in condition $c_v$ ($p_c, t_{cv}, S_o$). The exhaust gases, after expansion, will reach the same exhaust gas temperature $t_{ao}$, at condition $c_T$ ($p_c$, $t_{ao}$, $S_3$) which, upon expansion in turbine to pressure $p_o$, results in the higher difference $c_T$—2. Comparing the distances $a_v$—0 and $a_T$—1 at operating point $a$, as well as distance $c_v$—0 and $c_T$—1 at operating point $c$ immediately shows that for the combination of the system: exhaust gas turbine-hydrodynamic coupling-(Foettinger torque converter) displacement type compressor pump, an overall efficiency of 50 percent is sufficient in order to maintain the energy balance.

Figure 5:
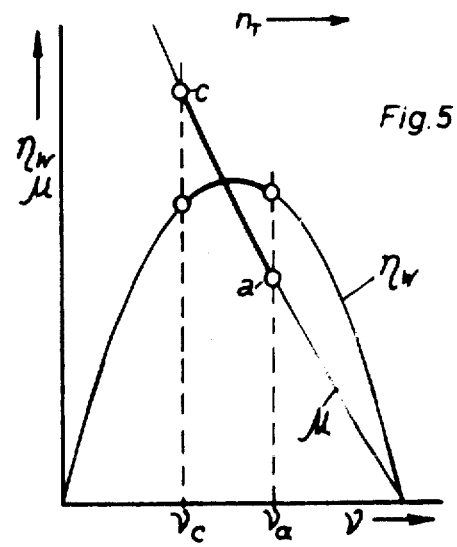
FIG. 5 is a graph of the efficiency $\eta$, and torque relationship $\mu$ depending on speed ratio $v$ of the fluid drive.

The graph of FIG. 5 illustrates the characteristics of the hydrodynamic energy transfer coupling. This is a Foettinger-type torque converter, which includes a hydraulic pump, a hydraulic turbine, and guide vanes. The graph shows relationship of efficiency $\eta_w$, torque $\mu$, and speed $v$. Let $n_{ht}$ be the speed of the hydraulic turbine, $n_{hp}$ the speed of the hydraulic pump, $M_{ht}$ torque of the hydraulic turbine and $M_{hp}$ torque of the hydraulic pump, then speed ratio $v = n_{ht}/n_{hp}$ (2)
torque ratio $\mu = M_{ht}/M_{hp}$ (3)
efficiency of the conversion $\eta = \mu \cdot v$ (4).

The hydraulic pump is in fixed no-slip driving engagement with the rotor of the exhaust gas turbine; and operating point $a$, at which exhaust gas turbine operates at low speed, then corresponds to the greater speed ratio $v_a$ of the torque converter; operating point $c$ corresponds to the lesser speed ratio $v_c$. If, in accordance with the above example, the supercharger compressor is to turn at constant speed, to obtain constant motor power output, then the turbine wheel of the hydraulic torque converter must be so arranged that, even with change in speed of $n_{hp}$ of the hydraulic pump, it, itself, maintains a constant speed $n_{ht}$. As seen in the diagram, only a small range of speed ratios is necessary for such a speed conversion, which range includes the maximum efficiency of the hydraulic coupling.

Figure 6:
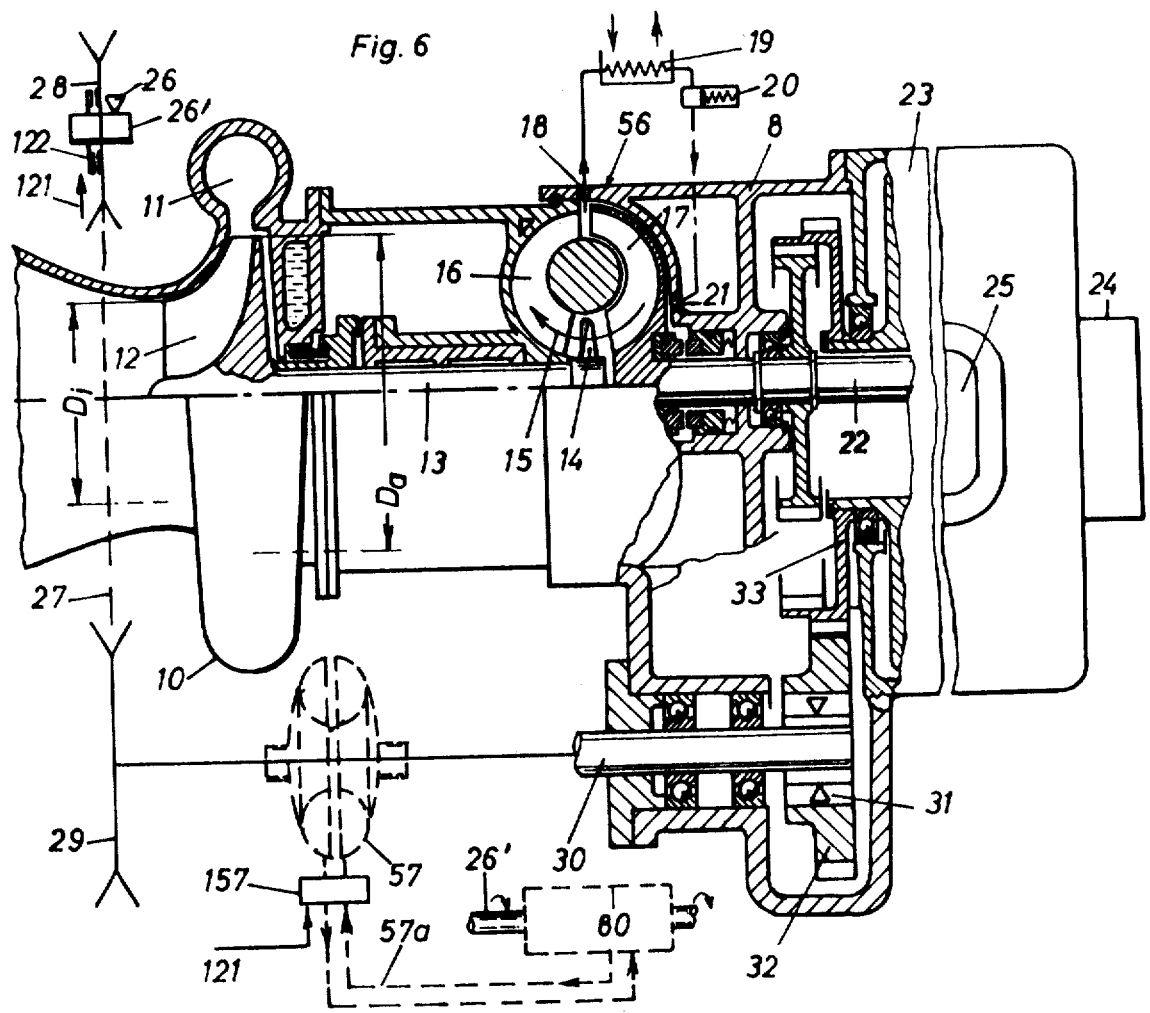
FIG. 6 is a schematic longitudinal sectional view illustrating one form of construction to carry out the present invention.

In FIG. 6, a turbine 10 of inwardly directed flow has a spiral inlet race 11, in which a turbine wheel 12, designed for a low value of $n_a$ as defined in equation (1), runs. The outer diameter $D_a$ of the turbine wheel is at least 20 percent greater than the inner diameter $D_i$ at the outlet end of the gases reaching the turbine, so that at high turbine speeds enough back pressure will result. Shaft 13, on which the turbine wheel 12 rotates, is fixedly connected with pump wheel 14 of the hydraulic Foettinger converter 56. The pump wheel, or propeller 14, is designed to have a high value of $n_a$ as defined in equation (1). The hydraulic operating fluid circulates in the direction of arrow 15 and is first applied to a guide vane assembly 16, and then to the turbine wheel 17. An opening 18 permits constant removal of hydraulic fluid which, after passing through a radiator-type heat exchanger 19, for colling, and through a pressure setting and adjustment device 20, is reintroduced at 21 into the Foettinger converter. Depending in the desired transmission ratios, the converter can also be operated with the hydraulic fluid circulating in a direction opposite to that of arrow 15, the turbine wheel 17 then operating like a centrifugal turbine. Turbine wheel 17 is connected to shaft 22, which in turn connects to a displacement-type supercharger compressor 23 of a construction illustrated in FIGS. 7 and 8. Inlet and outlet 24, 25 supply air to and deliver air from the compressor.

Supercharging the cylinders of the engine supplies greater quantities of air thereto, enabling higher compression and, with it, increase of the air temperature. This further increases the maximum pressure within the cylinders, resulting in higher mechanical loading on the engine. In accordance with a feature of the invention, the compression ratio $$\epsilon = \frac{V_H + V_T}{V_T}$$

is decreased $V_H$ = stroke; $V_T$ = volume of dead space). In order to obtain reliable supercharging even at lowest engine speeds, an additional drive is provided from the engine to the compressor, which is preferably connected over a clutch which automatically disengages when the engine exceeds a given speed, and which re-engages when engine speed drops below a predetermined value. This arrangement enables maintenance of the compression of the supercharged motor at the same level as that of an engine having a higher compression ratio but not designed for operation with a supercharger. The dead space, or dead volume of the engine can be somewhat increased, which is particularly desirable in engines in which the combustion chambers are subdivided, that is in which the combustion chamber may have an auxiliary premixing, or turbulence chamber. Additionally, this has the advantage that the combustion chambers are easier to shape and can be formed in more suitable ways in accordance with design requirements. By increasing the speed of the displacement-type compressor supercharger pump, the final compression temperature is increased, which enables internal combustion engines designed for use with various types of fuel to overcome starting difficulties when heavier fuels are employed.

The additional drive, as illustrated in FIG. 6, is the drive train formed by a centrifugal coupling 26 connected to the output shaft of the engine, schematically shown at 26', and engaging when the engine speed drops below a predetermined value, disengaging when the engine speed rises above a predetermined value. Coupling 26 is connected to a pulley 28, driving by means of belt 27 a pulley 29, connected to a shaft 30. Shaft 30 is connected with an overrun 31, and gear 32, engaging a matching gear 33 which forms part of the compressor rotor. When a certain speed is exceeded, the centrifugal coupling 26 disengages, permitting gear 33 to overrun gear 32, so that drive of the compressor rotor does not cause losses in the drive train 26–28–27–29. The auxiliary drive overcomes difficulties arising from differences in ignition temperatures when the engine is used with a variety of fuels. Other drives than the mechanical additional drives may be used, such as a hydrodynamic drive. This arrangement becomes particularly simple if the hydrodynamic drive between exhaust gas turbine and compressor is not made as one complete, integrated unit, but rather is broken up into its components, the exhaust gas turbine being coupled to a centrifugal pump, which supplies fluid flow over ducts to a fluid turbine which is in driving engagement with the compressor of the supercharger. The additional drive energy can also be transmitted by means of an oil pump driven by the engine, the supply flow of which is fed into the energy transfer arrangement. Remote interconnection will be described below.

Large engines, particularly two-stroke engines for marine drives, frequently do not have sufficient energy in the exhaust gases in order to obtain the necessary scavenging and combustion air by means of an exhaust gas turbine driving a compressor, when the engine is under low loading. For such drives, it has been proposed to supply additional auxiliary pumps, for example pumps at the bottom of the pistons. The above-described additional drive has the particular advantage that the very same supercharger compressor can also supply the substantially larger requirement of air during fractional loading of the marine engine. The drive system including the engine and the exhaust gas turbine on the one hand, and the compressor on the other, may require power transfer of various thousand horsepower. In accordance with a feature of the invention, the additional drive train for the compressor includes a further transmission element, indicated at 57 in FIG. 6, formed of a hydraulic coupling which can be selectively filled, or emptied of fluid and which is arranged to have displaceable vanes, or turbine blades.

Figure 7:
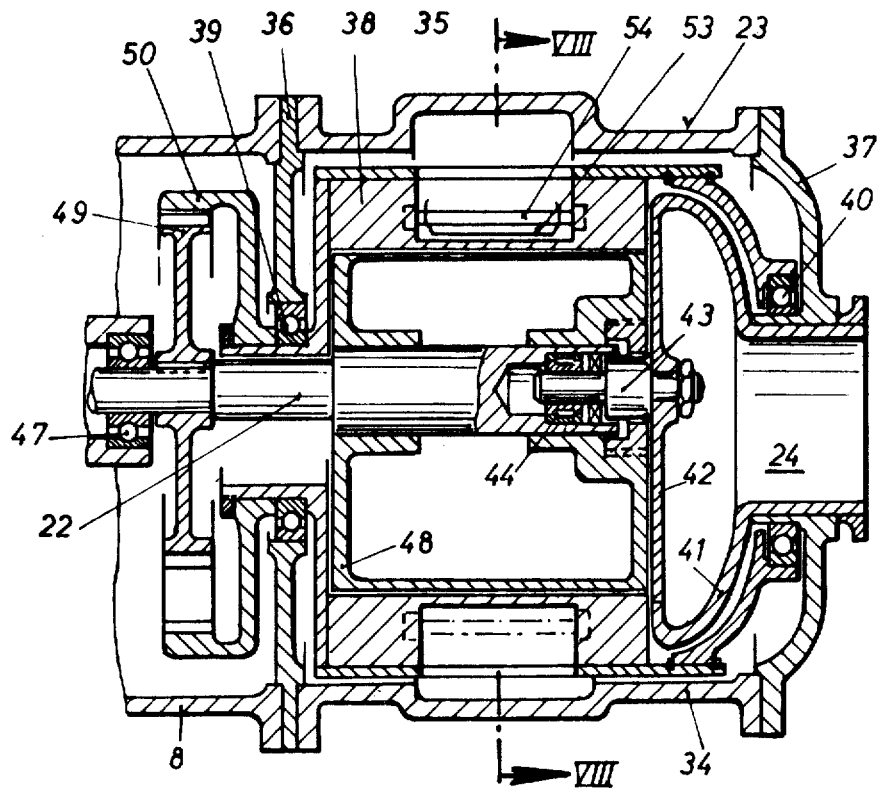
FIG. 7 is an axial cross-sectional view of the compressor pump.
Figure 8:
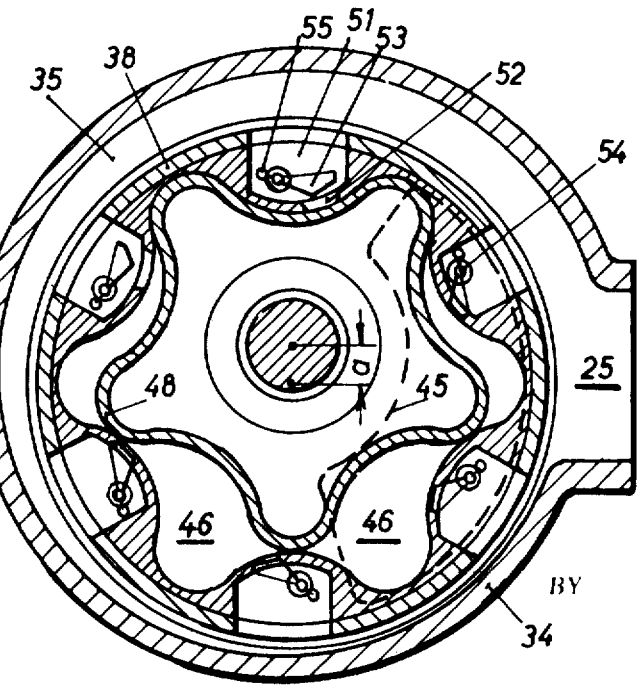
FIG. 8 is a transverse sectional view along lines VIII—VIII of FIG. 7.

The supercharger compressor 23 is shown in detail in FIGS. 7 and 8, and is enclosed in a housing 34 having a spiral-shaped collection duct 35, a pair of bell-shaped bearings supports 36, 37, in which bearings, for example ball bearings 39, 40, are located in order to retain rotor 38 therein. The inlet stub 24 is expanded, bell-shaped, internally, as seen at 41, the bottom of which forms a support wall 42 for a bearing stub 43, at one end of which shaft 22 is journaled in bearing 44. Wall 42 further has a segment-shaped inlet opening 45 formed therein, through which air admitted through inlet stub 24 can reach chambers, or working spaces 46. The other bearing, 47, likewise preferably a ball bearing, is located in intermediate part 8. The shaft of rotor 38 is offset by a distance $a$ with respect to the shaft of inner rotor 48, secured to shaft 22 which is driven over gear 49 with internal gear 50 to drive the outer rotor 38 in synchronism therewith.

Rotor 38 has a cycloid-shaped internal toothing, having six teeth; the inner rotor 48 is formed with cycloid-shaped projecting teeth having five teeth. The curvature at the head and inside of the toothings, as well as the axial distance $a$ are so adjusted relative to each other, that the two elements are opposed to each other with small spaces therebetween, forming chambers 46 which, during rotation, first increase in order to suck in gas such as air, and then decrease in order to compress the enclosed air. In the region of the heads, pockets 51 are formed in the outer rotor communicating with ducts 52 which are automatically controlled by valve flaps 53. Valve flaps are secured on small torsion springs 54, nonrotatably secured in the rotor 38. To prevent operation of the valve flaps 53 by centrifugal force, counterweights 55 are applied to the opposite ends thereof. Air compressed by operation of the compressor and reaching into chambers 51 is admitted through openings 52 and, from chamber 51, is taken out over the spiral-shaped outlet duct 25.

Figure 9:
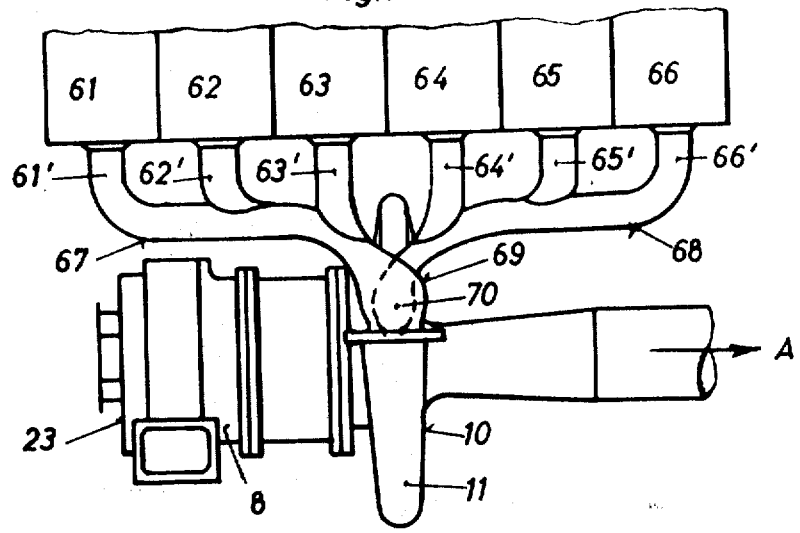
FIG. 9 is an arrangement of the exhaust gas turbine supercharger of a six-cylinder engine.

FIG. 9 illustrates the arrangement of the supercharger and exhaust turbine 10 when combined with a six-cylinder series motor, having cylinders 61, 62, 63, 64, 65, 66. If an inwardly directed flow turbine is used, without special inlet guidance, and having a low speed dependence, then it is desirable to apply the gases to the turbine as evenly as possible. Large motors may utilize specially formed manifolds (see, for example, German Pat. 1,932,560), which may be in the form of pulse converters. The arrangement according to FIG. 9 operates similarly to pulse converters. Exhaust manifold stubs 61', 62', 63' are connected to one common exhaust manifold line 67; manifold stubs 64', 65', 66' are combined into manifold duct 68. Ducts 67, 68 are concentrically connected within each other, forming at their outlets concentrically arranged nozzles 69, 70. Both nozzles 69, 70 direct a stream of exhaust gases into the spiral inlet race 11 of the exhaust gas turbine 10, which at the same time forms the mixing chamber for the pulse converter. In order to obtain good scavenging of the engine cylinders, it is desirable to arrange the firing distance of two cylinders to be smaller than the opening time of their respective outlet valves.

Supercharged internal combustion engines for vehicles may cause difficulties at starting, and particularly starting against inclines, and in accelerating the vehicle, since the compressor cannot immediately supply the higher combustion air necessary in order to burn an increased amount of fuel. Combustion thus is incomplete and results in smoking and carbon formation. In such arrangements, in accordance with the above-described feature of the invention, the auxiliary drive can be started immediately in order to bring the supercharger to a higher speed. This, however, still causes some delay. In order to avoid any possibility of smoking, and to enable pollution-free combustion of larger quantities of fuel, the greater amount of combustion air can be supplied by an air pulse from a compressed air line. Such a small amount of additional air can be obtained from a small compressed air tank, or compressed air supply, for example the supply from a compressed airbraking system. The displacement-type compressor, used in accordance with the present invention, makes special precautions unnecessary, for example such which are customarily used with centrifugal-type compressors, in which pumping has to be avoided.

Use of a displacement-type supercharger compressor, as well as ensuring adequate supply of supercharging, compressed air even when the engine is idling, permits fine distribution of the fuel into the inlet air, thus improving ignition and eventual combustion, while simultaneously cooling the air charge.

If the system of the present invention is used in an automotive vehicle, it is desirable to include a hydraulic hydrodynamic energy transmission stage in the first stage of the transmission, which is added to the lowest transmission range, so that the increasing torque, obtained from the supercharger, even though the speed of the engine drops, is increasing as the vehicle speed decreases, all the way to the point of vehicle speed zero.

The fluid coupling need not be one complete unit. Referring now to FIG. 10, internal combustion engine IC has its exhaust manifold (shown schematically only, and which may have the form of FIG. 9) 100 connected to the inlet of turbine 10; turbine drive shaft 13 and fluid torque converter pump 56a, form part of the component of the fluid drive. From fluid coupling pump 56a, fluid is supplied by a supply line 101 to fluid torque converter turbine 56b, which contains the element 17 and is connected to shaft 22. Fluid is returned over line 102. The fluid circuit 101, 102 may contain a suitable heat exchanger-radiator, pressure control, and the like, as illustrated in connection with FIG. 6. In order to provide additional air upon starting, or to provide quickly additional compressed air upon acceleration, compressed air is taken from an air supply tank 105 over line 106 and connected to the engine IC. To control the compressed air, a valve 107 is interposed, which may be responsive to sudden changes in position of a controller, such as a pedal 108, as schematically indicated by the interconnection shown by the broken line. Additionally, the valve 107 may be made to respond only at low speeds of the engine, as sensed by a tachometer generator 110, connected to be driven by the engine shaft, as schematically indicated by the broken line, and supplying a "low speed" output signal to valve 107 over line 109. Various alternatives suggest themselves, such as, for example, obtaining a low speed signal from turbine 10, from a pressure transducer from the inlet manifold and the like. To supply compressed air tank 105, a bleeder line 115 with a suitable pressure control therein can be branched from displacement-type compressor 23, provided compressor 23 is of sufficient size to supply compressed air to tank 105 when operating at high speed.

The present invention has been described particularly in connection with operation of a Diesel engine; or Otto-type engine; various modifications and changes my be made within the inventive concept to adapt the invention to requirements of the engines to which it is applied. As an example, most internal combustion engines include a pressure oil supply for lubrication, under pressure. Such pressure oil supply, schematically indicated at 116 in FIG. 10, can be tapped, to supply operating fluid to the fluid coupling by connecting line 116 into the fluid circuit of the fluid coupling, for example, as shown in FIG. 10, to fluid coupling pump 56a. When the engine IC drives a vehicle, the engine shaft 26' is preferably connected to a transmission 80, having a fluid torque conversion the first, or lowest range of gears. This fluid drive 80 can be so arranged that fluid can be taken directly therefrom over line 57a, to be applied through a valve 157 and to fill the fluid coupling 57 in the auxiliary transmission drive train from pulley 28, belt 27, pulley 29 to gears 32, 33. Valve 157 is so arranged that the fluid coupling 57 is selectively filled, or drained, thus connecting the fluid coupling into the drive train, and causing connection from the shaft 26' of the engine to the compressor gear 23. Control of the drain valve 157, which itself can be electrical, is over line 121. Line 121 in turn is controlled by a pressure transducer 120 (FIG. 10) connected to the output from compressor 23 and sensing low pressure of the supercharging compressor. If a signal is obtained from the low-pressure sensing transducer 120 over line 121, valve 157 will act to close the drain connection from fluid drive 57 to fluid drive and transmission 80, and open the supply connection over line 57a, to fill fluid drive 57 and cause transfer of power from shaft 26 to the drive train and compressor 23. Additionally, or alternatively, and if fluid drive 57 is to be a sealed unit, a magnetic clutch 122 can be coupled between pulley 28 and shaft 26', likewise controlled by line 121 from pressure transducer 120.

I claim:
1. Supercharging arrangement for internal combustion engines comprising
a radial flow turbine (10) connected to the engine to receive exhaust gases therefrom, said turbine having a turbine wheel (12), the outer diameter (D$a$) of which is greater by at least 20 percent than the inner diameter (D$i$), and having a low value on $n_q$,
in which $n_q$ is defined as

$$n_q = n \cdot \frac{\sqrt{V}}{H^{3/4}}$$

wherein $n$ = speed (r.p.m.); $V$ = flow volume, and $H$ = differential pressure;
a supercharging rotary compressor (23) of the displacement type and having outlet valves (53); and
a Foettinger torque converter of the three-element type driving said compressor from said turbine,
said torque converter comprising a pump element (14) supplying fluid and having a speed-fluid supply pressure-fluid supply volume characteristic which is highly speed-dependent, said pump having a propeller with a high value of $n_q$;
a radial-flow turbine (17) element driven by the fluid pumped by said pump element and having a speed-fluid supply pressure-fluid supply volume characteristic having a low degree of speed dependence, and having a value of $n_q$ which is low with respect to that of the pump element, said pump element (14) being coupled to be driven by said turbine (10) and the radial flow turbine element (17) being connected to drive a rotor of said rotary compressor (23), and
a guide vane assembly element (16) for said fluid, said three elements providing for torque conversion within a predetermined range of speed ratios $v$ between the pump element and the turbine element to drive the compressor indirectly by the exhaust gases of the internal combustion engine by means of the interposed hydrodynamic torque converter essentially independent of engine speed over wide ranges of said engine speed, the speed ratio $v$ varying automatically in accordance with the torque balance at the shafts of the pump element and of the turbine element.

2. Arrangement according to claim 1, wherein the exhaust gas turbine is a central-flow, centripetal-type turbine responsive to substantially constant throughput with varying pressure drops.

3. Arrangement according to claim 1, including means connected to the fluid circuit of the Foettinger torque converter to vary the volume-pressure characteristics of transfer of fluid flow between the elements of said Foettinger torque converter.

4. Arrangement according to claim 3, for use with an engine having a fluid circuit, wherein the fluid for the Foettinger torque converter is connected to the fluid circuit, said fluid circuit supplying fluid to the Foettinger torque converter interconnecting the exhaust gas turbine and the displacement-type compressor.

5. Arrangement according to claim 1, two of the elements of the Foettinger torque converter are remotely located from each other, and means (101, 102) are provided interconnecting said remotely located elements (FIG. 10).

6. Arrangement according to claim 1, including an additional drive (26', 26, 28, 27, 29) coupling the compressor (23) to the engine.

7. Arrangement according to claim 6, including means (26, 31) automatically disconnecting the additional drive when the engine speed exceeds a predetermined value.

8. Arrangement according to claim 6, including as additional Foettinger torque converter (57) interposed between the drive train from said engine (26') and the compressor (23).

9. Arrangement according to claim 8, wherein the fluid for the Foettinger torque converter in the additional drive is obtained from a hydraulic transmission connected to the engine.

10. Arrangement according to claim 1, in combination with an internal combustion engine, said internal combustion engine being designed for a predetermined compression pressure against the piston thereof, the cylinder dead space, compression pressure supplied by the displacement-type (pump) supercharging compressor and design pressure of the piston being correlated to supply maximum allowable working pressure on the piston at maximum compression during the compression stroke.

11. Arrangement according to claim 1, wherein the engine speed vs compressor speed transfer characteristics of the drive train including said Foettinger torque converter and the compression characteristics of said displacement-type supercharging compressor are correlated to provide compressed air at the output of the displacement-type supercharging compressor at increased temperature upon starting speed of the engine.

12. Arrangement according to claim 8, wherein the additional Foettinger torque converter includes a fluid circuit (57) selectively supplied with fluid, or having fluid drained therefrom.

13. Arrangement according to claim 6, including means (120) sensing a predetermined low pressure of the air supplied by said displacement-type compressor (23);
and means coupling said additional drive to the engine to increase the speed of said compressor and reestablish working pressure.

14. Arrangement according to claim 1, including a compressed air supply means (105);
and means controlling application of a pulse of compressed air to the internal combustion engine upon sudden acceleration.

15. Arrangement according to claim 1, wherein said displacement-type rotary compressor comprises a pair of rotors (38, 48), having matching, interengaging teeth and intervening depressions, said teeth and depressions progressively interengaging upon rotation of said rotors to compress air trapped therebetween;
a manifold (35); and
valves preloaded for a predetermined compression of the air trapped between said rotors, said valves permitting escape of compressed air into the manifold when the pressure of air trapped between the rotors corresponds to pressure in the manifold;
and means conducting said compressed air to the internal combustion engine.

16. Arrangement according to claim 1, in combination with an internal combustion engine and a transmission to drive a utilization device, wherein said transmission includes a Foettinger torque converter in the first stage of speed range.

17. Arrangement according to claim 1, wherein said internal combustion engine has an exhaust manifold, said exhaust manifold comprising a pair of branches, said branches being connected to an equal number of separate cylinder exhaust stubs, said branches terminating in concentrically located jet nozzles (FIG. 9), said jet nozzles directing the exhaust gases from the exhaust manifold of the engine to the inlet of said turbine (10) to even the pressure pulsations by conversion or pressure pulses to velocity effects and to provide smooth supply of exhaust gases to the inlet of the turbine.